May 24, 1938.        C. PRESS        2,118,106
BRAKE
Filed Feb. 8, 1937        3 Sheets-Sheet 1
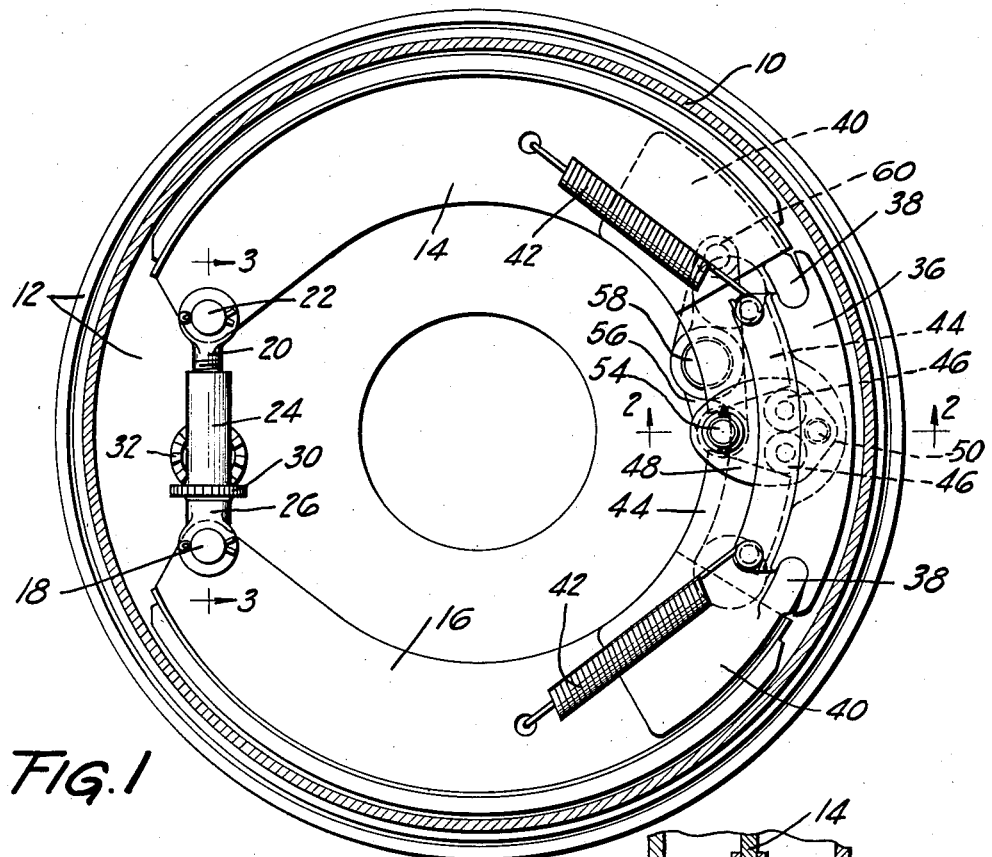
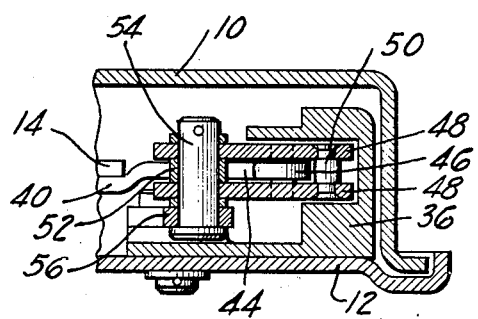
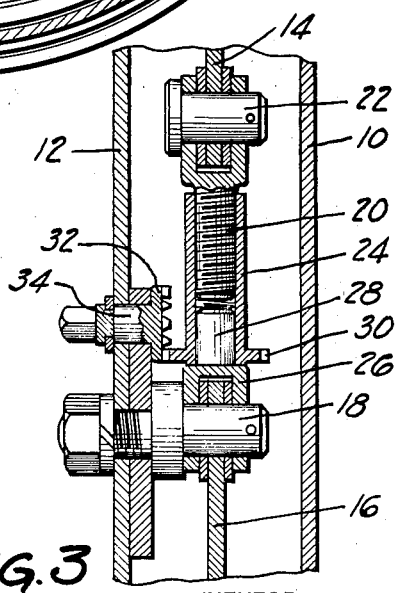
INVENTOR
CARL PRESS
BY M. W. McConkey
ATTORNEY May 24, 1938.     C. PRESS     2,118,106
BRAKE
Filed Feb. 8, 1937     3 Sheets-Sheet 2

INVENTOR
CARL PRESS
BY M.W. McConkey
ATTORNEY

May 24, 1938.  C. PRESS  2,118,106
BRAKE
Filed Feb. 8, 1937  3 Sheets-Sheet 3

INVENTOR
CARL PRESS
BY
M. W. McConkey
ATTORNEY

Patented May 24, 1938

2,118,106

UNITED STATES PATENT OFFICE 2,118,106

BRAKE

Carl Press, South Bend, Ind., assignor to Bendix Products Corporation, South Bend, Ind., a corporation of Indiana Application February 8, 1937, Serial No. 124,537

1 Claim. (Cl. 188—78)

This invention relates to brakes, and is illustrated as embodied in an internal expanding automobile brake. An object of the invention is to provide simple and effective means for applying the brake. In one desirable arrangement the backing plate of the brake carries a U-section bracket, into the ends of which extend projections on the ends of the shoes, a radially-movable applying member being arranged for wedging actuation on the ends of these projections.

These and other objects and features of the invention will be apparent from the following description of the illustrative embodiment shown in the accompanying drawings, in which:

Figure 1 is a vertical section through the brake, just inside the head of the brake drum, showing the brake shoes in side elevation;

Figure 2 is a partial section on the line 2—2 of Figure 1;

Figure 3 is a partial section on the line 3—3 of Figure 1;

Figures 4, 5:
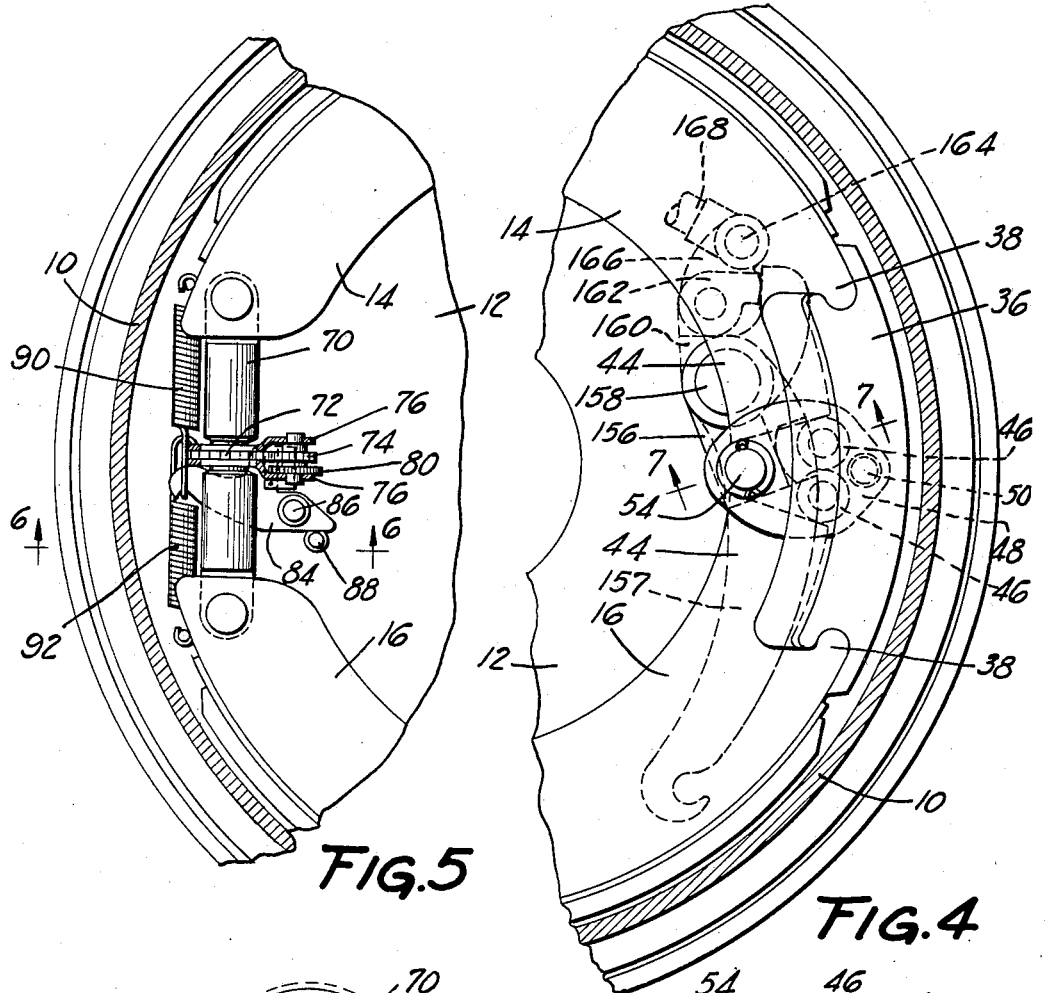
Figure 4 is a partial section, corresponding to the right-hand portion of Figure 1, but showing a different embodiment.
Figure 5 is a partial section, corresponding to the left-hand portion of Figure 1, but showing a different type of adjuster.
Figure 8:
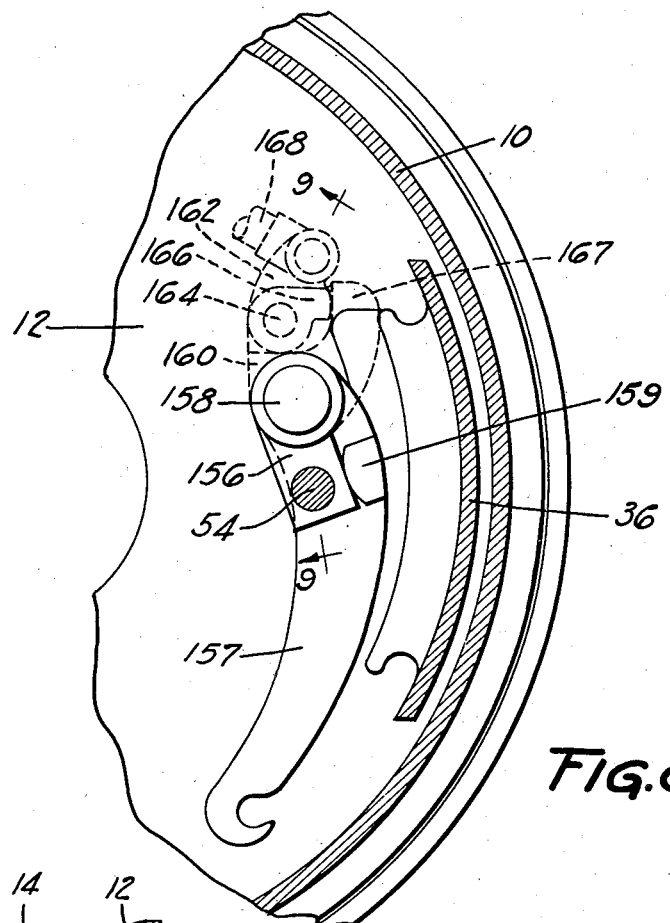

Figure 8 corresponds to Figure 4, but with the brake shoes removed; and

Figure 9:
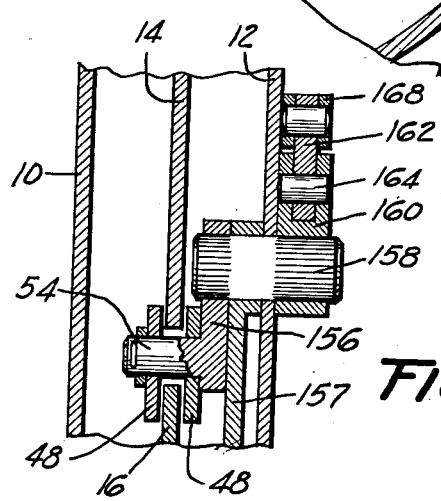

Figure 9 is a partial section on the line 9—9 of Figure 8.

The brake illustrated in Figures 1-3 includes a rotatable drum 10, at the open side of which is a backing plate 12, and within which are a pair of shoes 14 and 16. The shoe 16 is pivotally mounted at one end directly on an anchor post 18 carried by the backing plate. The shoe 14 has at its anchored end a wear adjuster connecting it to the same anchor post 18.

The wear adjuster shown in Figures 1 and 3 includes a threaded stem 20 connected to the shoe 14 by a pivot 22, and on which an adjusting sleeve 24 is threaded, and a fork 26 pivoted on the anchor 18 and having an unthreaded stem 28 on which the sleeve 24 is rotatably mounted. The sleeve 24 is shown formed with an integral pinion 30 meshing with a small crown gear 32 carried by a shaft 34 journaled in the backing plate.

Across the brake from the anchor 18, the backing plate has bolted or otherwise secured thereto, adjacent its periphery, a U-section bracket 36. This bracket is shown notched at its ends to receive positioning lugs 38 formed on plates 40 secured to the ends of the shoes. Return springs 42 urge these lugs 38 into their respective notches.

The plates 40 also have projections 44 extending into the opposite ends of the bracket 36, and having at their adjacent ends diverging faces wedgingly engaged by radially movable rollers 46 rotatably mounted between plates 48. The plates have a spacing rivet 50 at their outer ends, and their inner ends (together with a spacing washer 52) are pivotally mounted on a pin 54 carried by an arm 56 fixed on a shaft 58 extending through the backing plate.

Outside the backing plate, the shaft 58 may have an operating arm 60 linked to a hydraulic or compressed-air actuator of any desired type.

In the arrangement of Figure 4, the pivot 54 connects the plates 48 with their rollers 46, to a lever 156 fixed on a pivot 158 which also has mounted thereon a lever 157 having a lug 159 engaging arm 156, and extending downwardly between the shoe 16 and the backing plate, and formed at its end with a hook, for attachment to a Bowden-type control.

Outside the backing plate the shaft 158 has fixed thereon an arm 160, which alternatively operates the wedge rollers. There is pivoted on arm 160 a thrust arm 162 by means of a pivot 164. The thrust arm 162 has pivoted thereto a connecting rod 168 from a hydraulic actuator or the like, and is formed with a cam part 166 thrusting against a follower 167 rigid with the arm 160.

Figures 6, 7:
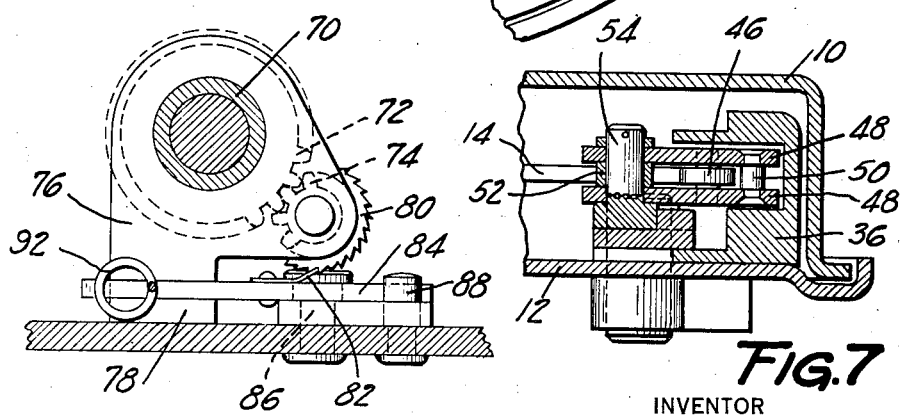
Figure 6 is a partial section on the line 6—6 of Figure 5.
Figure 7 is a partial section on the line 7—7 of Figure 4.

Figures 5 and 6 illustrate an adjuster which may be used when the shoes 14 and 16 are to anchor on the bracket 36, instead of on an anchor post 18. This adjuster includes sockets 70 pivoted to the shoe ends and into which are threaded (by right and left threads) stems extending in opposite directions from a flange 72.

The flange 72 is formed with teeth meshing with a small pinion 74 journaled between plates 76 on opposite sides of the flange 72 and having parts 78 slidably engaging the backing plate to prevent turning of the plates.

The pinion 74 is rigid with a ratchet 80 engaged by a spring pawl 82 carried by a lever 84 fulcrumed at 86 on the backing plate, and one end of which engages a stop pin 88 when the brake is released. The other end of the lever 84 is connected to a tensioned spring 90 hooked at its other end over a pin carried by the backing plate. Another spring 92 is tensioned between the backing plate and the plates 76.

The springs 90 and 92 serve to center the brake when released, with lever 84 engaging stop 88.

In operation, when the brake is applied the part 78 of the lower plate 76 rocks the lever 84 against the resistance of spring 90. If the brake is unduly worn, lever 84 will move far enough to cause pawl 82 to engage the next tooth of the ratchet 80, whereupon when the brake is next released the spring 90 will turn the adjuster by an amount corresponding to one ratchet tooth.

While various illustrative constructions have been described in detail, it is not my intention to limit the scope of the invention to those particular constructions, or otherwise than by the terms of the appended claim.

I claim:

A brake comprising a backing plate having a U-section bracket mounted thereon adjacent its periphery, said bracket having notches in its ends, shoes having parts seating in said notches and provided with projections extending into the opposite ends of the bracket, the end faces of the projections diverging from each other radially of the brake, and a radially-movable applying device within said bracket and having rollers in wedging engagement with the end faces of said projections.

CARL PRESS.